United States Patent [19]
Iida et al.

[11] Patent Number: 6,111,635
[45] Date of Patent: Aug. 29, 2000

[54] APPARATUS FOR VERIFYING WIRE GAUGES OF MULTI-CORE OPTICAL FIBER

[75] Inventors: Rikihiro Iida; Kazuhiro Ohki, both of Tokyo, Japan

[73] Assignee: Ando Electric Co., Ltd., Tokyo, Japan

[21] Appl. No.: 09/280,514

[22] Filed: Mar. 30, 1999

[30] Foreign Application Priority Data

Mar. 31, 1998 [JP] Japan .................................. 10-087763

[51] Int. Cl.$^7$ .................................................. G01N 21/00
[52] U.S. Cl. ............................................. 356/73.1; 385/24
[58] Field of Search ............................. 356/73.1; 385/14, 385/15, 17, 18, 24, 31, 42, 16; 359/181, 167, 110, 117, 120, 121, 157, 177

[56] References Cited

U.S. PATENT DOCUMENTS 5,077,814  12/1991  Shigematsu et al. .
5,905,588  5/1999  Takashima et al. .

FOREIGN PATENT DOCUMENTS 69-091832  4/1987  Japan .
6-094572   4/1994  Japan .
8-304232   11/1996 Japan .

*Primary Examiner*—Frank G. Font
*Assistant Examiner*—Tu T. Nguyen
*Attorney, Agent, or Firm*—Morgan, Lewis & Bockius LLP

[57] ABSTRACT

An apparatus for verifying the wire gauges of a multi-core optical fiber including a multi-output light source unit having a plurality of output terminals, and an integrated light receiving device having a plurality of light receiving elements which are integrated into one body. In the apparatus, outputs of the multi-output light source unit are inputted into the respective cores of the multi-core optical fiber, rays of output light from the multi-core optical fiber are collectively received by the integrated light receiving device, and a plurality of outputs of the integrated light receiving device are inputted into an operational processor circuit, so that the wire gauges are verified from the light receiving position of the integrated light receiving device.

4 Claims, 3 Drawing Sheets

APPARATUS FOR VERIFYING WIRE GAUGES OF MULTI-CORE OPTICAL FIBER

BACKGROUND OF THE INVENTION

1. Field of the Invention

The present invention relates to an apparatus for verifying the wire gauges of a multi-core optical fiber and more particularly to an apparatus for verifying the coincidence between the input alignment order and the output alignment order of a multi-core optical fiber for use as an optical communication medium.

2. Description of the Related Art

A typical multi-core optical fiber is in the form of a tape which is made by aligning a plurality of optical fiber cores on a plane. The multi-core optical fiber requires that the input alignment order and the output alignment order should be coincident with each other. Assuming that these two sorts of order are not coincident, it is impossible to transmit an optical signal through any intended transmission line. However, verifying the coincidence between input and output wire gauges is required because an unsatisfactory product whose input alignment order and output alignment order are not coincident is produced at rare intervals in the stage of manufacturing multi-core optical fibers.

A conventional method of verifying the wire gauges of a multi-core optical fiber will be described With reference to FIG. 6. In FIG. 6, reference numeral 5 designates a light source; 12, an optical power meter; and 4, a multi-core optical fiber.

Each of the rays of output light from the multi-core optical fiber 4 has heretofore been measured with the optical power meter 12 by inputting the output of the light source 5 into each of the cores of the multi-core optical fiber 4 when the wire gauges of the multi-core optical fiber 4 are verified. For example, an input core numbered 1 is connected to the light source 5 and then the output of an output core numbered 1 is verified by the optical power meter 12.

It has been extremely troublesome to make preparations for measurement in the conventional method because the output side of the multi-core optical fiber 4 is separated into single cores and each of the cores is connected to the optical power meter 12 for measuring purposes and besides a great deal of measuring time has been necessitated. Moreover, there has been some possibility of making an error in verifying the wire gauges because the optical output of the output core is measured while the connection of the light source 5 to the input core is being switched.

SUMMARY OF THE INVENTION

An object of the present invention is to provide an apparatus for verifying the wire gauges of a multi-core optical fiber in which the coincidence between the input alignment order and the output alignment order of the multi-core optical fiber can be verified simply and accurately in a short time.

In order to achieve the above object, the invention provides an apparatus for verifying wire gauges of a multi-core optical fiber, comprising: a multi-output light source unit having a plurality of output terminals for inputting outputs thereof into respective cores of the multi-core optical fiber; an integrated light receiving device having a plurality of light receiving elements which are integrated into one body for collectively receiving rays of output light from the multi-core optical fiber; and an operational processor circuit for verifying the wire gauges of the multi-core optical fiber from a light receiving position of the integrated light receiving device based on a plurality of output signals of the integrated light receiving device.

In consequence, the wire gauges are verified from the light receiving position of the integrated light receiving device through the steps of inputting the outputs of the multi-output light source unit into the respective cores of the multi-core optical fiber, having the rays of output light received by the integrated light receiving device collectively from the multi-core optical fiber and inputting the plurality of outputs of the integrated light receiving device into the operational processor circuit.

DETAILED DESCRIPTION OF THE PREFERRED EMBODIMENTS

Figure 1:
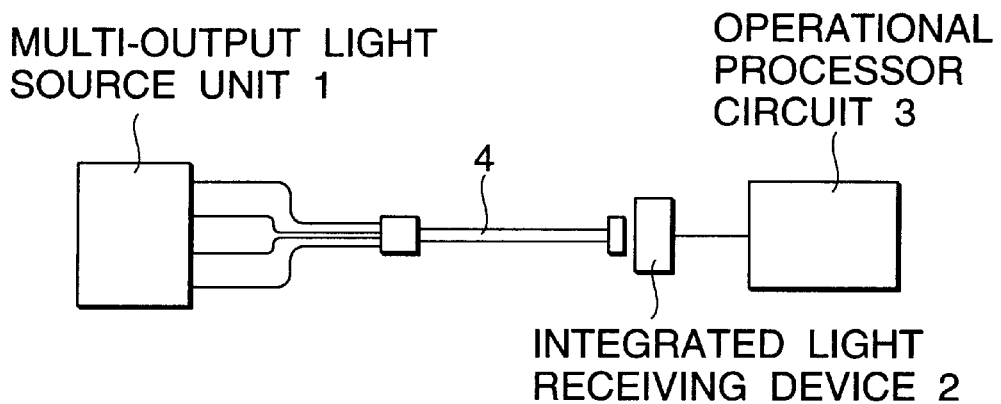
FIG. 1 is a block diagram illustrating essential units of an apparatus for verifying the wire gauges of a multi-core optical fiber as a first embodiment of the invention.

An apparatus for verifying the wire gauges of a multi-core optical fiber as a first embodiment of the invention will be described with reference to FIG. 1. In FIG. 1, reference numeral 1 designates a multi-output light source unit; 2, an integrated light receiving device; 3, an operational processor circuit; and 4, a multi-core optical fiber.

In the first embodiment of the invention, the output terminals of the multi-output light source unit 1 are connected to the respective input terminals of the multi-core optical fiber 4. Further, the output terminals of the multi-core optical fiber 4 are collectively connected to the integrated light receiving device 2. The integrated light receiving device 2 for use is such that a number of light receiving elements are integrated in an extremely narrow area and the output of the integrated light receiving device 2 is connected to the operational processor circuit 3.

When the coincidence between the input alignment order and the output alignment order of the multi-core optical fiber 4 is verified in this embodiment of the invention, the output of the multi-output light source unit 1 is switched in the input alignment order of the multi-core optical fiber 4 first. When the input alignment order and the output alignment order of the multi-core optical fiber 4 are coincident with each other, the light receiving position of the integrated light receiving device 2 is sequentially moved in the alignment order. The integrated light receiving device 2 feeds into the operational processor circuit 3 the signal output of each of the integrated light receiving elements. On verifying the sequential movement of the light receiving position on the integrated light receiving device 2 in the output alignment order, the operational processor circuit 3 verifies the coincidence between the input alignment order and the output alignment order of the multi-core optical fiber 4.

Assuming that the input alignment order and the output alignment order of the multi-core optical fiber 4 are not coincident, the operational processor circuit 3 is unable to verify the sequential movement of the light receiving position on the integrated light receiving device 2 in the output alignment order to thereby decide the multi-core optical fiber 4 to be an unsatisfactory product.

Figure 2:
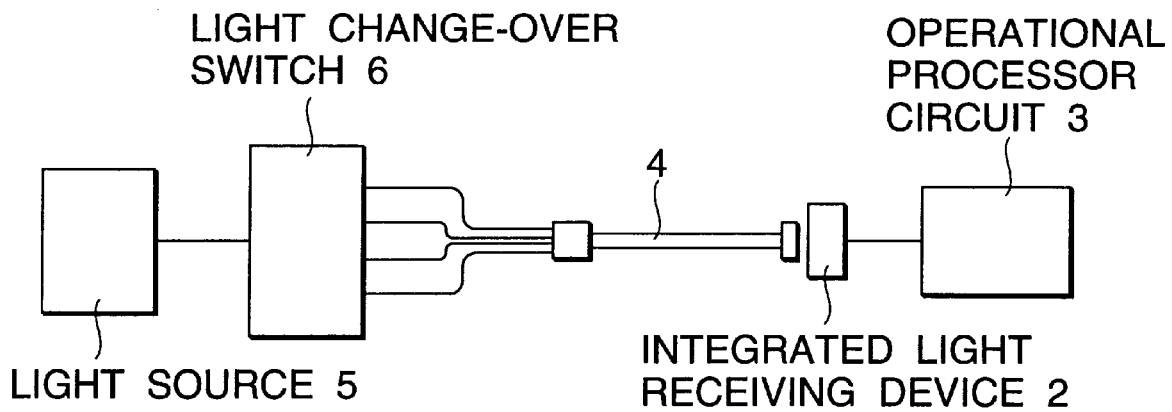
FIG. 2 is a block diagram illustrating essential units of an apparatus for verifying the wire gauges of a multi-core optical fiber as a second embodiment of the invention.

An apparatus for verifying the wire gauges of a multi-core optical fiber as a second embodiment of the invention will be described with reference to FIG. 2. In FIG. 2, reference numeral 5 designates a light source; and 6, a light change-over switch.

In this embodiment of the invention (also in each of the following embodiments thereof), like reference numerals designate like components in the first embodiment thereof.

In this embodiment of the invention, the output of the light source 5 is connected to the light change-over switch 6 having a plurality of output terminals, and the output terminals of the light change-over switch 6 are connected to the respective input terminals of the multi-core optical fiber 4. Then the output of the light change-over switch 6 is switched in the input alignment order of the multi-core optical fiber 4. Any other procedure is similar to that in the first embodiment of the invention.

When the coincidence between the input alignment order and the output alignment order of the multi-core optical fiber 4 is verified in this embodiment of the invention, the output of the light change-over switch 6 is switched in the input alignment order of the multi-core optical fiber 4 first. When the input alignment order and the output alignment order of the multi-core optical fiber 4 are coincident with each other, the light receiving position of the integrated light receiving device 2 is sequentially moved in the alignment order. The integrated light receiving device 2 feeds into the operational processor circuit 3 the signal output of each of the integrated light receiving elements. On verifying the sequential movement of the light receiving position on the integrated light receiving device 2 in the output alignment order, the operational processor circuit 3 verifies the coincidence between the input alignment order and the output alignment order of the multi-core optical fiber 4.

Assuming that the input alignment order and the output alignment order of the multi-core optical fiber 4 are not coincident, the operational processor circuit 3 is unable to verify the sequential movement of the light receiving position on the integrated light receiving device 2 in the output alignment order to thereby decide the multi-core optical fiber 4 to be an unsatisfactory product.

Figure 3:
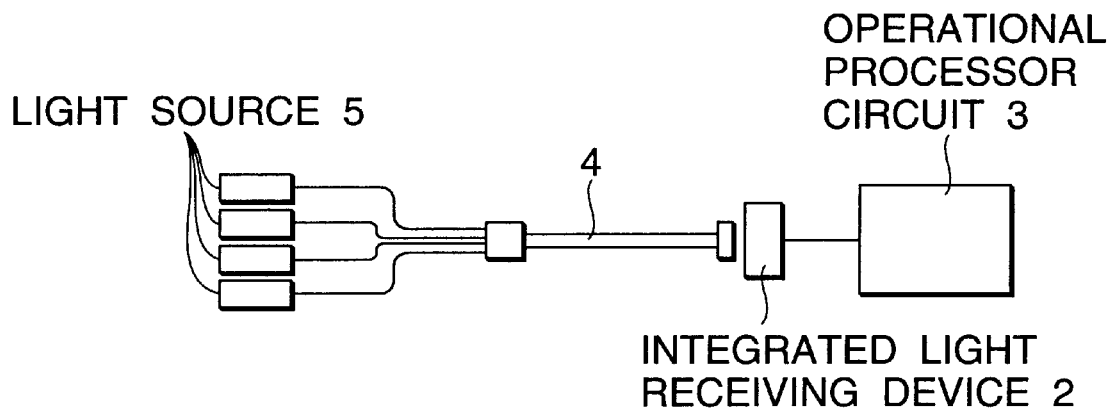
FIG. 3 is a block diagram illustrating essential units of an apparatus for verifying the wire gauges of a multi-core optical fiber as a third embodiment of the invention.

An apparatus for verifying the wire gauges of a multi-core optical fiber as a third embodiment of the invention will be described with reference to FIG. 3. In FIG. 3, reference numeral 5 designates light sources.

In this embodiment of the invention, the outputs of a plurality of light sources 5 are connected to the respective input terminals of the multi-core optical fiber 4. Then the output of the light sources 5 is switched in the input alignment order of the multi-core optical fiber 4. Any other procedure is similar to that in the first embodiment of the invention.

When the coincidence between the input alignment order and the output alignment order of the multi-core optical fiber 4 is verified in this embodiment of the invention, the output of the light sources 5 is switched in the input alignment order of the multi-core optical fiber 4 first. When the input alignment order and the output alignment order of the multi-core optical fiber 4 are coincident with each other, the light receiving position of the integrated light receiving device 2 is sequentially moved in the alignment order. The integrated light receiving device 2 feeds into the operational processor circuit 3 the signal output of each of the integrated light receiving elements. On verifying the sequential movement of the light receiving position on the integrated light receiving device 2 in the output alignment order, the operational processor circuit 3 verifies the coincidence between the input alignment order and the output alignment order of the multi-core optical fiber 4.

Assuming that the input alignment order and the output alignment order of the multi-core optical fiber 4 are not coincident, the operational processor circuit 3 is unable to verify the sequential movement of the light receiving position on the integrated light receiving device 2 in the output alignment order to thereby decide the multi-core optical fiber 4 to be an unsatisfactory product.

Figure 4:
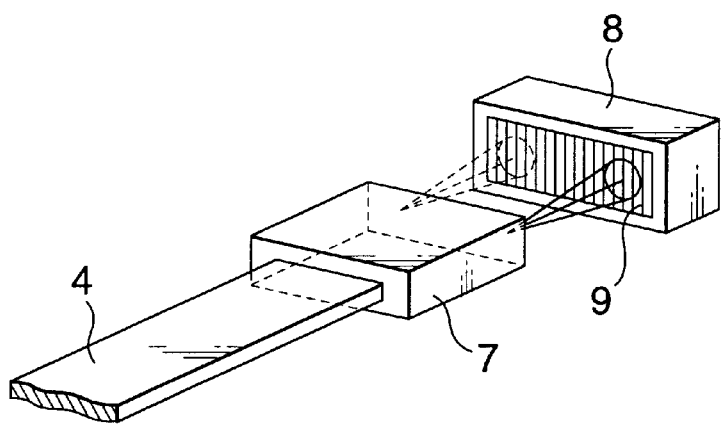
FIG. 4 is a block diagram illustrating essential units of an apparatus for verifying the wire gauges of a multi-core optical fiber as a fourth embodiment of the invention.

The principal part of an apparatus for verifying the wire gauges of a multi-core optical fiber as a fourth embodiment of the invention will be described with reference to FIG. 4. In FIG. 4, reference numeral 4 designates a multi-core optical fiber; 7, a connector; 8, a photodiode array; and 9, an array-type light receiving unit.

In this embodiment of the invention, the photodiode array 8 is employed as the integrated light receiving device. The output portion of the multi-core optical fiber 4 is machined in the form of the connector 7, for example. The light outputted from the connector 7 is applied to the array-type light receiving unit 9 of the photodiode array 8 in which a number of photodiodes are integrated in one body in an extremely narrow area. The array-type light receiving unit 9 for use is in such a form that the photodiodes are integrated at several tens $\mu$m intervals. Optical fibers are aligned at 250 $\mu$m intervals at the edge surface of the connector 7 as the output portion of the multi-core optical fiber 4. Thus, the light emitted from the cores of the connector 7 is made incident on the different photodiodes of the array-type light receiving unit 9, thereby the light receiving position of the array-type light receiving unit 9 is clarified via the operational processor circuit 3 (not shown), so that the output alignment order of the multi-core optical fiber 4 can be verified.

It is therefore verified that the multi-core optical fiber 4 has no problem when the input alignment order and the output alignment order of the multi-core optical fiber 4 are coincident with each other also in this embodiment of the invention, whereas when the input alignment order and the output alignment order of the multi-core optical fiber 4 are not coincident, the multi-core optical fiber 4 can be decided to be an unsatisfactory product.

Figure 5:
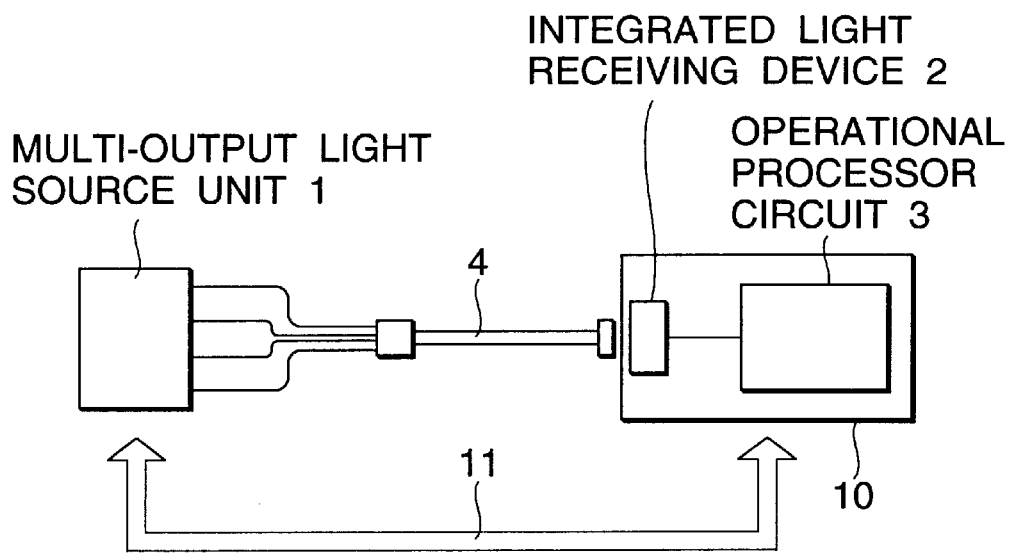
FIG. 5 is a block diagram illustrating essential units of an apparatus for verifying the wire gauges of a multi-core optical fiber as a fifth embodiment of the invention.
Figure 6:
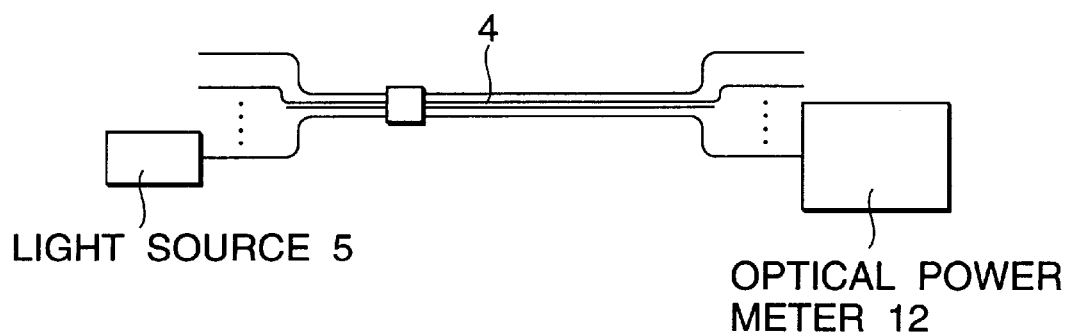
FIG. 6 is a block diagram for explaining a conventional method of verifying the wire gauges of a multi-core optical fiber.

An apparatus for verifying the wire gauges of a multi-core optical fiber as a fifth embodiment of the invention will be described with reference to FIG. 5. In FIG. 5, reference numeral 10 designates a light receiving unit; and 11, a communication means.

The output of the multi-output light source unit 1 is switched from one to another via the communication means 11, to thereby measure the light receiving position of the integrated light receiving device 2 in the light receiving unit 10.

The light receiving unit 10 which is constituted by the integrated light receiving device 2 and the operational processor circuit 3, and the multi-output light source unit 1 are connected to each other by the communication means 11 in this embodiment of the invention. The communication means in this case is a so-called GP-IB or the like. The operation according to this embodiment of the invention is intended to control the repetition of the switching of the output terminal of the multi-output light source unit 1 and the operation of verifying the output position in the light receiving unit 10 via the communication means 11. According to this embodiment of the invention, the switching of the input to the multi-core optical fiber 4 and the measurement of the output thereof can automatically be performed, respectively. It is therefore possible to shorten the measurement time and to obviate a measurement error.

According to the present invention, since the sequential movement of the light receiving position of the integrated light receiving device in the output alignment order is verified by sequentially switching the output terminal of the multi-output light source unit in the input alignment order of the multi-core optical fiber, this makes it possible to provide an apparatus for verifying the coincidence between the input alignment order and the output alignment order of the multi-core optical fiber simply and accurately in a short time. The use of the apparatus for verifying the wire gauges of the multi-core optical fiber results in greatly shortening the time required to make tests for verifying the wire gauges of the multi-core optical fiber and improving the reliability of the test results.

What is claimed is:

1. An apparatus for verifying wire gauges of a multi-core optical fiber, comprising:

a multi-output light source unit having a plurality of output terminals for inputting outputs thereof into respective cores of the multi-core optical fiber;

an integrated light receiving device having a plurality of light receiving elements which are integrated into one body for collectively receiving rays of output light from the multi-core optical fiber; and an operational processor circuit for verifying the wire gauges of the multi-core optical fiber from a light receiving position of said integrated light receiving device based on a plurality of output signals of said integrated light receiving device, wherein a light receiving unit which is constituted by said integrated light receiving device and said operational processor circuit, and said multi-output light source unit are connected to each other by communication means, and output of said multi-output light source unit is switched from one to another via said communication means to measure the light receiving position of said integrated light receiving device.

2. The apparatus as claimed in claim 1, wherein said multi-output light source unit includes a light source having at least one output terminal and a light change-over switch having at least one input terminal for receiving an output of said light source as well as a plurality of output terminals.

3. The apparatus as claimed in claim 1, wherein said multi-output light source unit includes a plurality of light sources each having an output terminal.

4. The apparatus as claimed in claim 1, wherein said integrated light receiving device includes a photodiode array integrating the plurality of light receiving elements.

* * * * *